United States Patent
Taneja

(10) Patent No.: US 7,729,308 B2
(45) Date of Patent: Jun. 1, 2010

(54) OPTIMAL ALLOCATION OF RESOURCES IN A WIRELESS COMMUNICATION SYSTEM

(75) Inventor: Mukesh Taneja, Rajasthan (IN)

(73) Assignee: Texas Instruments Incorporated, Dallas, TX (US)

( * ) Notice: Subject to any disclaimer, the term of this patent is extended or adjusted under 35 U.S.C. 154(b) by 556 days.

(21) Appl. No.: 11/419,213

(22) Filed: May 19, 2006

(65) Prior Publication Data

US 2007/0268860 A1    Nov. 22, 2007

(51) Int. Cl.
*H04Q 7/00*    (2006.01)
(52) U.S. Cl. .................. 370/329; 370/468; 370/437; 370/498; 455/452.2; 455/506
(58) Field of Classification Search .......... 370/329, 370/328, 468, 437, 333, 332; 455/506, 67.13
See application file for complete search history.

(56) References Cited

U.S. PATENT DOCUMENTS

| | | | |
|---|---|---|---|
| 2004/0120347 A1* | 6/2004 | Lee et al. .................. | 370/468 |
| 2005/0201332 A1* | 9/2005 | Bakshi et al. .............. | 370/333 |
| 2006/0135075 A1* | 6/2006 | Tee et al. .................. | 455/67.13 |
| 2006/0193338 A1* | 8/2006 | Zheng et al. ............... | 370/437 |
| 2007/0004437 A1* | 1/2007 | Harada et al. .............. | 455/506 |

\* cited by examiner

*Primary Examiner*—Charles N Appiah
*Assistant Examiner*—Michael T Vu
(74) *Attorney, Agent, or Firm*—Lawrence J. Bassuk; W. James Brady; Frederick J. Telecky, Jr.

(57) ABSTRACT

Optimal allocation of a number of sub carriers to applications having diverse QoS requirements and executing on terminal devices (e.g., mobile stations). A base station (BS) considers the QoS requirements and the observed QoS for each of the applications in computing the number of sub carriers allocated to each terminal device in the forward link direction in a given time slot. For allocation in the reverse link direction, the terminal device transmits a first bit indicating whether the aggregate queue lengths (of all applications) exceeds a pre-specified threshold and a second bit indicating whether a delay bound requirement is likely to be violated in the absence of sub carrier allocation. The BS computes the number of sub carriers to be allocated in the reverse link direction based on the respective two bits received from the terminal devices.

29 Claims, 11 Drawing Sheets

$$H_{ZxN}(t) = \begin{bmatrix} h(1,1)[t] & \ldots\ldots\ldots\ldots\ldots\ldots & h(1,N)[t] \\ h(2,1)[t] & \ldots\ldots\ldots\ldots\ldots\ldots & h(2,N)[t] \\ h(k,1)[t] & \ldots\ldots h(k,s)[t]\ldots\ldots & h(k,N)[t] \\ h(Z,1)[t] & \ldots\ldots\ldots\ldots\ldots\ldots & h(Z,N)[t] \end{bmatrix}_{ZxN}$$

FIG. 3B
*(Prior Art)*

OPTIMAL ALLOCATION OF RESOURCES IN A WIRELESS COMMUNICATION SYSTEM

BACKGROUND OF THE INVENTION

1. Field of the Invention

The present invention relates to wireless communications, and more specifically to a method and apparatus for providing optimal allocation of resources in a wireless communication system.

2. Related Art

A wireless communication system may be viewed as containing a wireless network which connects various mobile devices (or, in general, any terminal device). Mobile network represents an example wireless network providing wireless communication between mobile devices. In general, mobile networks contain systems such as base stations which communicate over air with individual mobile devices.

Wireless networks generally operate over an allocated frequency spectrum. The allocated frequency spectrum is divided into a number of sub carriers used for transferring information of interest. In general, a sender (base station or mobile station, depending on the direction) transfers the information to a receiver on one or more of the allocated sub carriers. OFDMA represents a technology which operates according to such an approach, and a base station often allocates the sub carriers to the individual mobile stations (for sending or receiving, in general transferring).

In general, time is logically divided into a number of slots ("time slots"), and a sub carrier may be allocated for a transfer in each time slot. Accordingly, it may be appreciated that the quality of services (QoS) provided to applications depend on respective number of sub carriers allocated in the corresponding time slots. Accordingly, the sub carriers and the time slots may be viewed as resources.

The allocation of resources is of particular importance when multi-media applications are supported in the mobile network and in mobile stations, since different applications require different QoS (hereafter "required QoS"). For example, delay sensitive applications such as VoIP, video conferencing have QoS specifications in terms of delay bound, delay jitter and throughout. Applications such as web browsing (over TCP) have QoS specifications in terms of their average delay and throughout. On the other hand, file transfer (e.g. FTP) applications have QOS specifications in terms of throughout. The QoS requirements can be either qualitative (high/low data throughput) or quantitative (CBR of 128 Kbps), can be user specified or understood from the nature/type of the application.

Accordingly, there is a general need for optimal allocation of sub carriers to devices supporting multimedia application in a wireless communication system or providing different QOS to different applications.

BRIEF DESCRIPTION OF THE DRAWINGS

The present invention will be described with reference to the following accompanying drawings, which are described briefly below.

FIG. 3B is a matrix representing the reception quality on respective sub carriers determined at the mobile devices and is maintained in a BS.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A base station provided according to an aspect of the present invention determines a number of sub carriers to be allocated to each application (executing on a terminal device) in each time slot by considering both the required QoS as well as the observed QoS. Observed QoS refers to the quality of services provided in the past (in time domain). By considering both required QoS and the observed QoS, subcarries may be allocated optimally among the applications.

In one embodiment, the observed QoS includes the delay encountered so far in transmitting a packet (and in particular, how close that delay is to violation of the delay bound requirement) awaiting transmission in a queue, average delay of packets in the queue, average throughput of packets transmitted in a fixed prior duration, etc.

According to another aspect of the present invention, a base station examines packets (e.g., the port numbers of TCP/IP packets) related to (from/to) an application to classify the application to an application type, and a set of parameters (and corresponding values) are selected based on the application type for purpose of computing the sub carriers to be allocated in each time slot. In an embodiment, the applications are classified based on the type of QoS that would be required (e.g., high throughput, low jitter, etc.).

According to one more aspect of the present invention, a BS allocates the sub carriers in the reverse link direction (i.e., from the terminal devices to the base station) based on two parameters, with one (first) parameter indicating whether the aggregate number of packets (or other measures of queue length) to be transmitted (for the application in the terminal device) is exceeding a threshold and another parameter indicates whether a delay bound requirement would be violated in a specified future duration in the absence of allocation of sub carriers. In one embodiment implemented in the context of OFDMA systems, the two parameters are represented by respective feedback bits.

According to yet another aspect of the present invention, a terminal device examines the internal queues and sends the two parameters to a BS, which allocates the subcarrriers for the reverse link.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Environment

Figure 1:
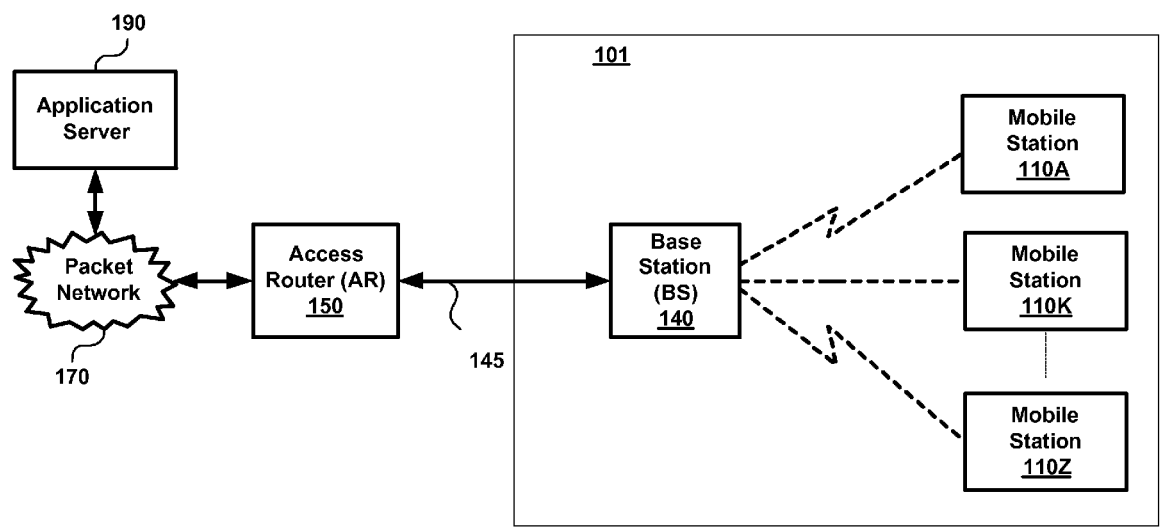
FIG. 1 is a block diagram of a mobile network illustrating an example environment in which several aspects of the present invention can be implemented.

FIG. 1 is a block diagram of a mobile network illustrating an example environment in which various aspects of the present invention can be implemented. The environment is shown containing mobile stations 110A-110Z, base station (BS) 140, access router (AR) 150, packet network 170 and application server 190. Each system is described below in further detail.

Base station (BS) 140 and mobile stations 110A-110Z form a mobile/wireless network 101. Packet network (back bone) 170 operates according to protocols such as Internet Protocol (IP) and/or ATM, and AR 150 provides the necessary interface between the mobile network 101 and the packet network 170. Data from/to application server 190 is encoded according to standard in the mobile network 101, and according to Internet Protocol in packet network 170. For further details, the reader is referred to the corresponding standard documents.

Only example systems are included in the Figure for illustration. Typical environments contain many more systems, for example to provide voice telephone calls to distant users over PSTN network or another mobile network. In addition, only the details of various systems as relevant to an understanding of various features of the present invention are provided herein for conciseness.

Application server 190 provides several services, which can be accessed via packet network 170. For example, application server 190 may correspond to a web server which receives HTTP requests and provides the corresponding data in the form of web pages. Packet network 170 provides transport for various data packets, and can be implemented according to protocols such as Internet Protocol and ATM, as is well known in the relevant arts.

AR 150 performs the necessary protocol translations in transferring data between packet network 170 and the mobile network 101. For example, the data in the payload of the data packets received from packet network 170 may be encoded in radio packets consistent with the protocol requirements of the mobile network 101, and provided to BS 140. Similarly, the data in the radio packets received from BS 140 is encoded in the payload of data packets suitable for transmission on packet network 170.

Mobile stations 110A through 110Z communicate to BS 140 using wireless communication system. Each mobile device/station 110A-110Z may run different applications and provide multiple services such as teleconferencing, multimedia application, web browsing etc., to the user. Mobile stations 110A-110Z may receive data from and send data to application server 190 through BS 140.

BS 140 provides features such as wireless/radio access (i.e., access to mobile stations) to mobile stations 110A-110Z and may provide link maintenance (soft handoff when mobile station moves from one cell to the other). BS 140 maintains status of each mobile device/station 110A-110Z and allocates sub carriers to each mobile device for transmitting/receiving data on mobile network 101.

several subcarriers would be available for communication between BS 140 and the mobile stations 110A-110Z based on the techniques and standards used for implementing mobile/wireless network 101. Various aspects of the present invention provide for efficient allocation of the subcarriers, as described in sections below. The features will be clearer in comparison with a prior approach. Accordingly, an example prior wireless network is described below in further detail.

3. Example Prior OFDMA System

Figure 2:
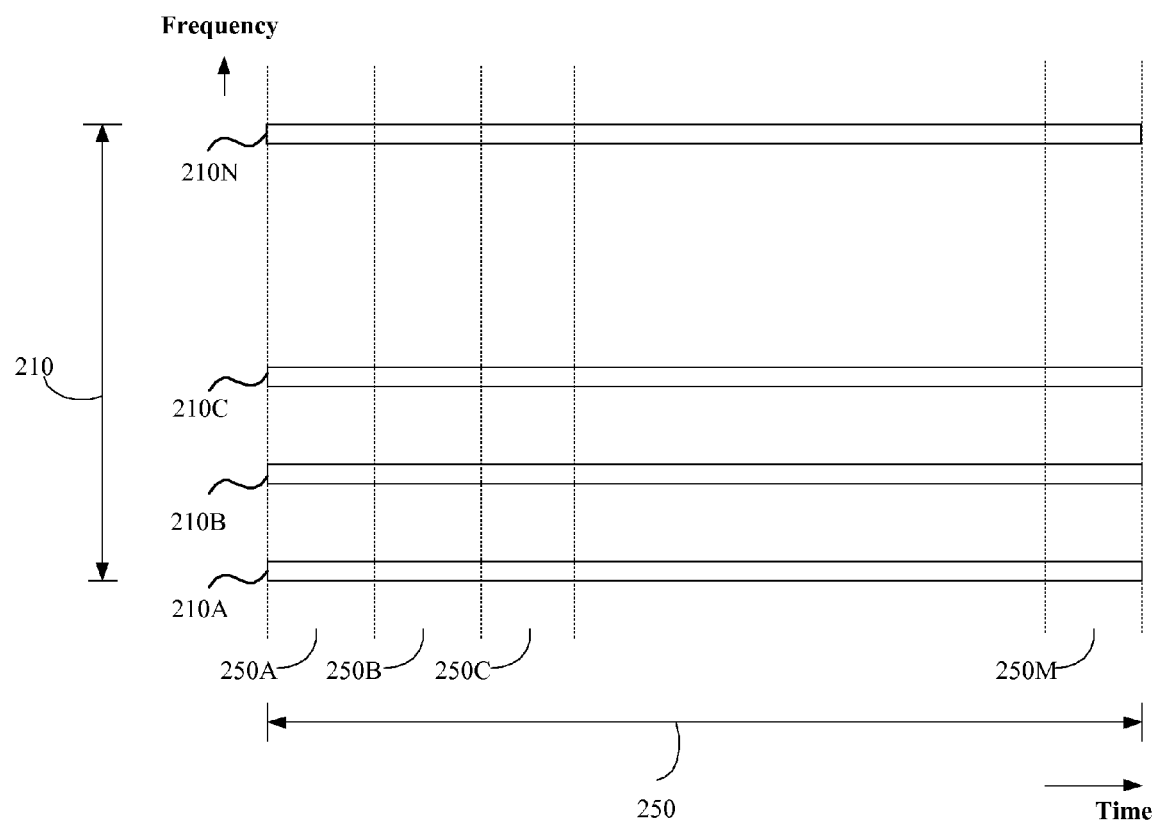
FIG. 2 is a graph illustrating manner in which available frequency spectrum is divided into a number of orthogonal subcarriers in an example OFDMA wireless system.

FIG. 2 is a graph illustrating manner in which available frequency spectrum is divided into a number of orthogonal sub carriers in an example OFDMA (orthogonal frequency division multiple access) wireless system. The X-axis represents time and Y-axis represents frequency. The graph is described below in further detail.

The description is provided with the assumption that a frequency band 210 (representing ofrequency spectrum) is available for mobile network 101. Accordingly in one embodiment of OFDMA system, available frequency band 210 is divided into N sub carriers 210A-210N. sub carrier. The number of sub carriers N within available frequency band 210 may vary based on various parameters such as modulation technique, relationship between sub carriers etc.

Figure 3A:
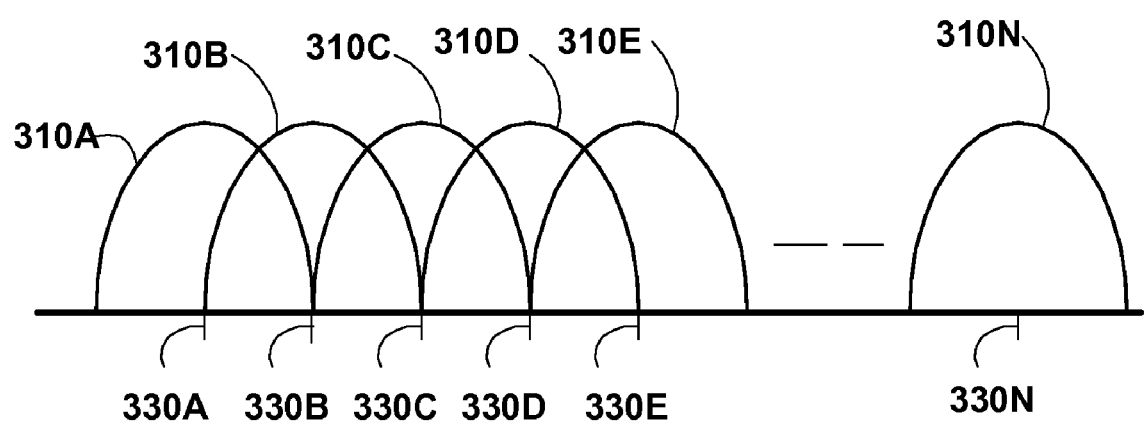
FIG. 3A illustrates the manner in which N sub carriers are allocated to Zmobile devices in an example OFDMA system.

FIG. 3A illustrates the manner in which N sub carriers are selected in an example OFDM system. Shown there are overlapping frequency bands 310A-310N with corresponding center frequency 330A-330N. The center frequencies 330A-330N respectively represents frequencies of sub carrier 210A-210N and are orthogonal to each other.

Continuing with reference to FIG. 2, time range (X axis) is divided into a number of time slots 250A-250M. BS 140 may allocate sub carrier 210A-210N in each time slot based on reception quality sub carrier at the mobile station. Each sub carrier in each time slot 250A-250M is often referred to as sub carrier. The sub carrier reception quality of a sub carrier in corresponding time slot referred to as sub carrier quality and is determined by the mobile station. The sub carrier quality is sent to the BS 140 according to a known protocol. An example table representing sub carrier quality is described below.

FIG. 3B is a matrix 350 ($H_{Z \times N}(t)$) representing sub carriers quality at the mobile devices maintained in BS 140. Each row 360A-360Z represents the sub carriers (210A-210N) and each column 380A-380Z represent mobile stations (110A-110Z). Every element in the matrix represents the corresponding sub carrier quality (reception quality) at the corresponding mobile station at time t.

For example, element $h(1,1)[t]$ represents the channel quality of the first sub carrier (210A) at first mobile device/station (110A), $h(Z,1)[t]$ represents the channel quality of sub carrier (210N) at first mobile station (110A), $h(1,N)[t]$ represents the channel quality of sub carrier (210A) at last mobile station (110Z) and $h(Z,N)[t]$ represents the channel quality of sub carrier (210N) at last mobile device/station (110Z). In general $h(i,j)[t]$ represents ith channel quality at jth mobile device/station.

Each mobile station communicate present channel quality for each of the sub carriers to BS 140 on a control channel. BS 140 dynamically allocates sub carriers 210A-210N to devices for transmitting/receiving data from/to the mobile devices in each time slots 250A-250M based on entry in matrix 350 as one of the parameter.

BS 140 transmits the data in each time slots 250A-250M to corresponding mobile devices on the subcarriers allocated for such transmission. Similarly, BS 140 communicates to each mobile device the allocated sub carriers in the time slots for sending data to BS 140. Accordingly each mobile device transmits the data to BS 140 on the allocated (and communicated) sub carriers.

Transmission from the base station to mobile devices is often referred to as forward link. The data transfer from mobile station to base station is referred to as reverse link. Sub carriers are allocated for both forward link and reverse link by the BS 140. However the number of sub carriers allocated to each mobile device in a time slot may be different.

In one prior embodiment BS maintains a queue for each application (synonymous with flow, for simplicity) run in the mobile station and the number of sub carriers allocated (in forward link direction) to each mobile device is determined based on the queue length. The prior embodiment is described below in further detail.

4. Prior Sub Carrier Allocation Technique

Figure 4A:
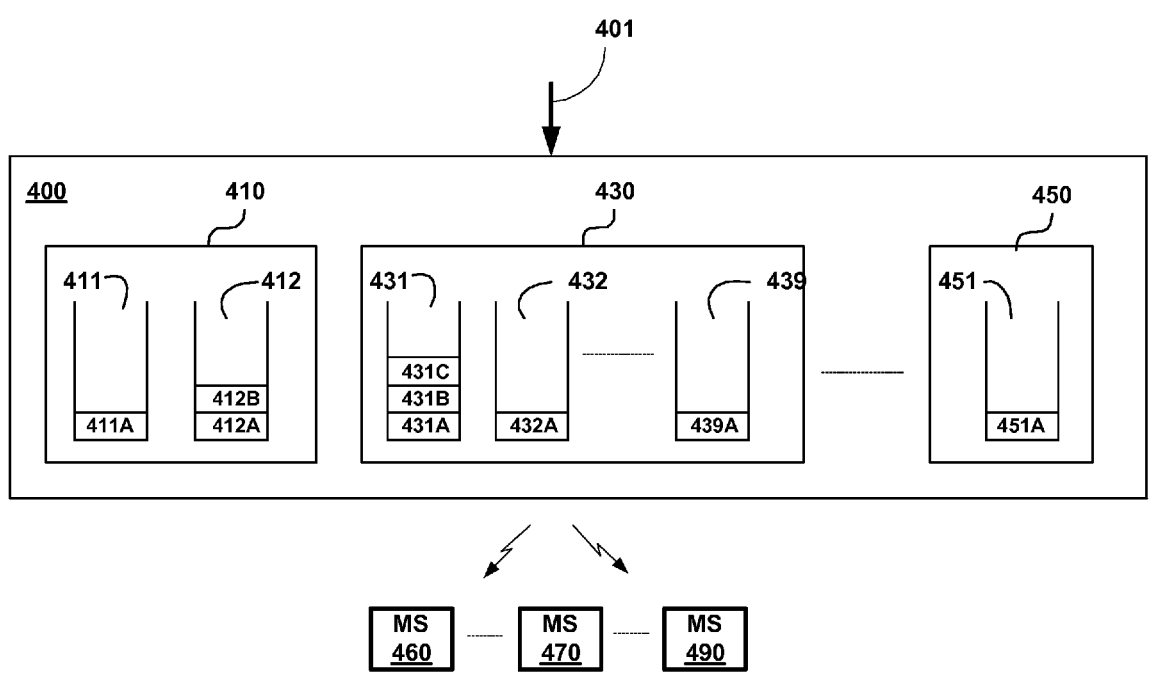
FIGS. 4A and 4B respectively illustrate the details of forward link sub carrier allocation and reverse link sub carrier allocation in one prior approach.
Figure 4B:
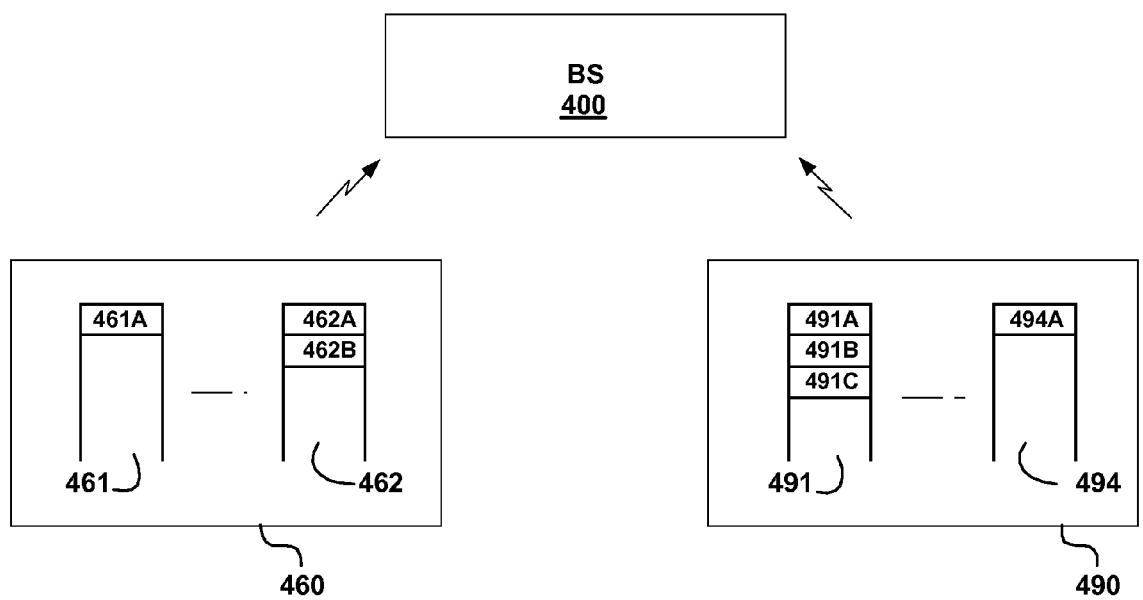

FIGS. 4A and 4B respectively illustrate the details of forward link sub carrier allocation and reverse link sub carrier allocation in one prior approach. Continuing description first with respect to FIG. 4A, shown there is a base station 400, mobile stations 460, 470 and 490, and queues 411, 412, 431-439 and 451. Each block is described below in further detail.

The description is provided with the assumption that mobile stations 460, 470 and 490 respectively run two, nine, and one applications. Accordingly, base station 400 maintains queues two queues 411-412, nine queues 431-439 and a queue 451 respectively for mobile stations 460, 470 and 490.

Base station 400 receives packets from the packet network on path 401 and sends the packets to corresponding queue for transmission. Base station 400 may receive packets in IP packet format and fragment the received IP packets into a number of MAC packets. The MAC packets are stored in a queue for transmission.

Base station 400 allocates sub carriers to each application/queue/flow for transmitting the packets. The number of sub carriers allocated to each queue in a time slot may depend on the queue depth. For example flow/queue 431 (and hence mobile device/station 470) may be allocated higher number of sub carriers compared to other flows due to the longer queue depth.

Similarly, allocation of sub carriers for reverse link is described with respect to FIG. 4B. Shown there are mobile stations 460 and 490 transmitting packets to BS 400. Mobile station 460 is shown containing queues 461 and 462 corresponding to two applications. Mobile station 490 is shown containing queues 491-494 representing four applications.

Mobile stations 460 and 490 transmit information representing the number of queue/flows and queue depth information. In one prior embodiment implemented according to the 3GPP standard available on the world-wide-web at (www.3gpp.org), a mobile station uses a signaling bit associated with corresponding application to indicate whether any of the queue lengths exceeds a corresponding threshold.

A logic 1 on the signaling bit indicates queue depth (of at least one application) is greater than a threshold and a logic 0 may indicate otherwise. Accordingly, number of sub carriers allocated to mobile stations for reverse link is determined based on the value on the signaling bits.

As a result, BS 400 may merely provide/allocate more number of sub carriers (in the reverse link direction) to the mobile stations with at least one application having larger queue depth compared to mobile stations without long queues. However, such an allocation technique may not support desired differentiated quality of services required for various multimedia applications.

Various aspects of present invention provide resource allocation in each time slot which overcome at least some of the disadvantages noted above. The features are described below with respect to an example architecture of a base station for illustration.

5. Example Architecture of a BS

Figure 5:
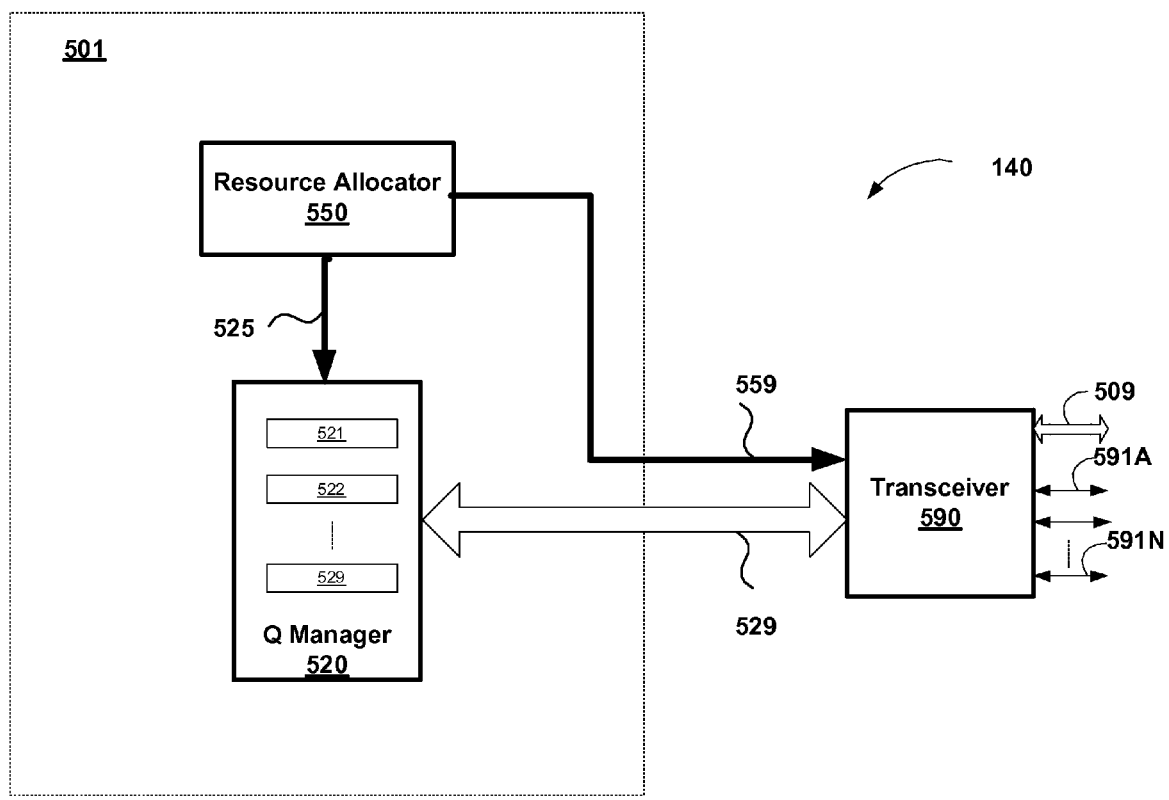
FIG. 5 is a block diagram illustrating various functional units of a base station.

FIG. 5 is a block diagram illustrating various functional units of a base station 140 in one embodiment. The block diagram is shown containing scheduler 501 and transceiver 590. Scheduler 501 is further shown containing queue manager (Q manager) 520 and resource allocator 550. Only the blocks (particularly in the forward link direction) relevant to an understanding of the features of the invention are included for conciseness. Each block is described below in further detail.

Queue manager 520 is shown managing queues 521-529 corresponding to queues 411, 412, 431-439, and 451 (storing the packets related to 3 different applications) described with respect to FIG. 4A. Scheduler 501 receives packets belonging to different applications from AR 150 on path 145. Queue manager 520 stores the received packets in the corresponding queues 521-529 and provides the packets to transceiver 590 for transmission. The status of each queue is sent to resource allocator 550 on path 525, or alternatively resource allocator 550 may examine the status/content of the queues to determine the required information.

Transceiver 590 receives the packets in each queue 521-529 from queue manager on carrier path 529 and sub carrier allocation information representing the allocation of specific sub carriers to each queue 521-529 for a time slot t on path 559. Transceiver 590 transmits the packets (of the corresponding queues) on sub carriers allocated by resource allocator 550.

Similarly, on one of the control channels (e.g., 509), transceiver 590 transmits the allocation information (received from resource allocator 550) for the reverse link direction. The control channel is also used to receive some of the parameter values used for allocating the specific sub carriers in both the reverse link and forward link directions.

Resource allocator 550 receives various information (either from queue manager 502 or transceiver 590) required for assigning the specific sub carriers (in forward link and reverse link directions) to specific mobile stations/queues in each time slot according to various aspects of the present invention as described below in further detail.

6. Efficient Allocation of Sub Carriers in Forward Link Direction

Figure 6:
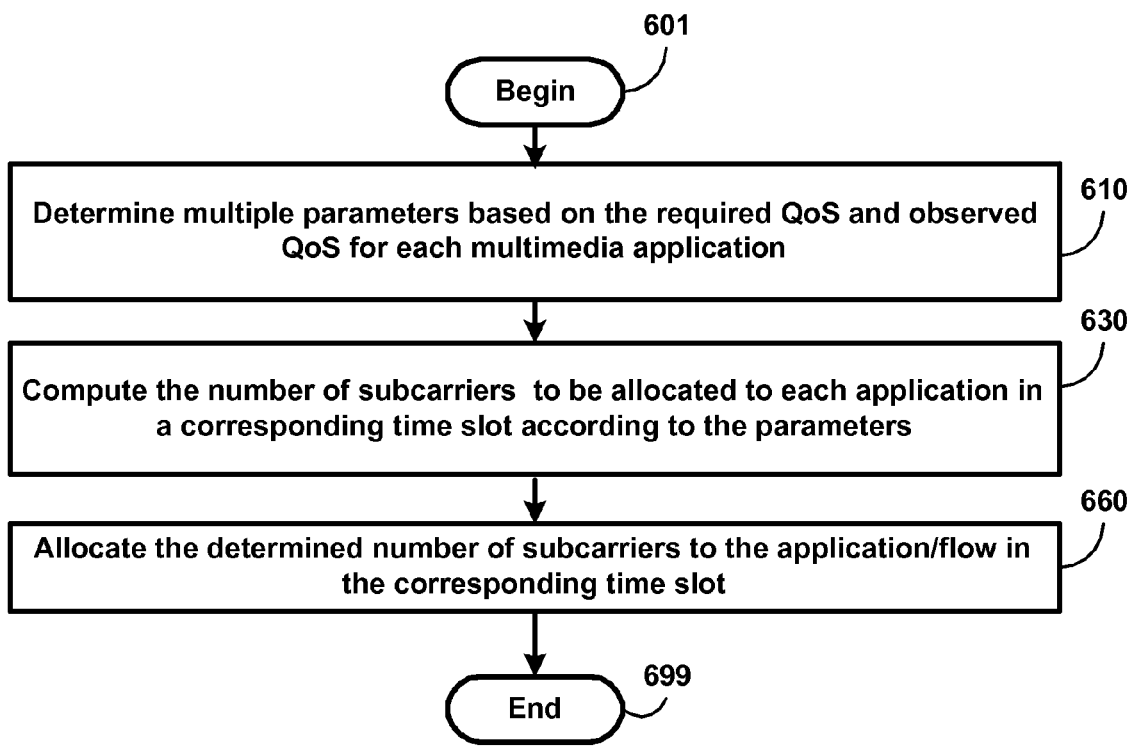
FIG. 6 is a flowchart illustrating the manner in which sub carriers in the forward link direction are allocated according to several aspects of the present invention.

FIG. 6 is a flowchart illustrating forward link sub carrier allocation in each time slot according to several aspects of the present invention. The flowchart is described with respect to the components of FIG. 5 (in particular with reference to a scheduler 520 in the base station) for illustration. However, the features can be implemented in other environments, without departing from the scope and spirit of various aspects of the present invention. The flowchart begins in step 601 and control passes to step 610.

In step 610, resource allocator 550 determines multiple parameters based on the required QoS and observed QoS for each multimedia application. The required QoS and observed QoS may be determined in various ways, as suited for the specific environments. In an embodiment, the required QoS parameters are sent by mobile stations at the time of initiating the application on a parallel control channel (e.g., layer 2 or 3 signaling). Alternatively, BS 140 may determine the required QoS based on the type of application (e.g., examining the IP header fields specifically the DSCP (differentiated services code point) field of the IP header, etc., in each flow of data to determine the application type).

In step 630, resource allocator 550 computes the number of sub carriers to be allocated to each application in a corresponding time slot according to the parameters. Various approaches can be employed in such a determination. An example approach is described below in further detail.

In step 660, resource allocator 550 allocates the determined number of sub carriers to the application/flow. Transceiver 590 then transmits the data corresponding to each application/flow on the corresponding allocated sub carriers. The flow chart ends in step 699.

The manner in which the number of sub carriers may be allocated to each flow (and thus eventually mobile stations) according to parameters (representing required QoS and observed QoS) is described below in further detail.

In the approach, different required QoS parameters are considered for different types of applications. Accordingly, the applications are first classified into different classes. The required QoS for the application follows from the classification. Accordingly, the classifications are described below first.

7. Classifications

According to an aspect of the present invention, applications/flows are classified based on the corresponding required QoS. Accordingly, parameters defining the required QOS are identified for each class. Thus, base station may determine the parameters by identifying the application type by its class. The classifications are listed below.

Class 1: the flows in this class correspond to applications such as VoIP, video conferencing over RTP etc., that are sensitive to real-time delay and jitter. The computation of number of sub carriers is performed based on delay bound (or worst case acceptable delay after which the delayed packet gets dropped) and minimum throughput requirements (required data transfer rate) in an example embodiment of the present invention.

Class 2: The flows in this class correspond to applications such as MPEG streaming or streaming like services that are delay sensitive. In this case, the computation of number of sub carriers is performed using delay bound and throughput requirements with less stringent requirements than in class 1.

Class 3: The flows in this class correspond to applications such as web browsing, TCP flows, etc., requiring acceptable levels of average delay and data throughput rate. Accordingly, the computation of number of sub carriers is performed using throughput requirement and average delay.

Class 4: This class represents flows with throughput requirement such as data transfer using file transfer protocol (FTP), or any block transfer of data.

Class 5: This class represents the best effort flows wherein the sub carriers are allocated with least priority (availability of sub carrier).

It may be appreciated that the number of sub carriers to be allocated to meet the various QoS requirements can be determined by comparing the corresponding ones of the required QOS parameter values with the observed QOS parameter values. The observed QOS parameter values may be determined by, among other information/actions, observing the queue/flow for each flow. Accordingly, some terminology related to a queue/flow used in determining these parameters, is described with reference to FIG. 7.

Figure 7:
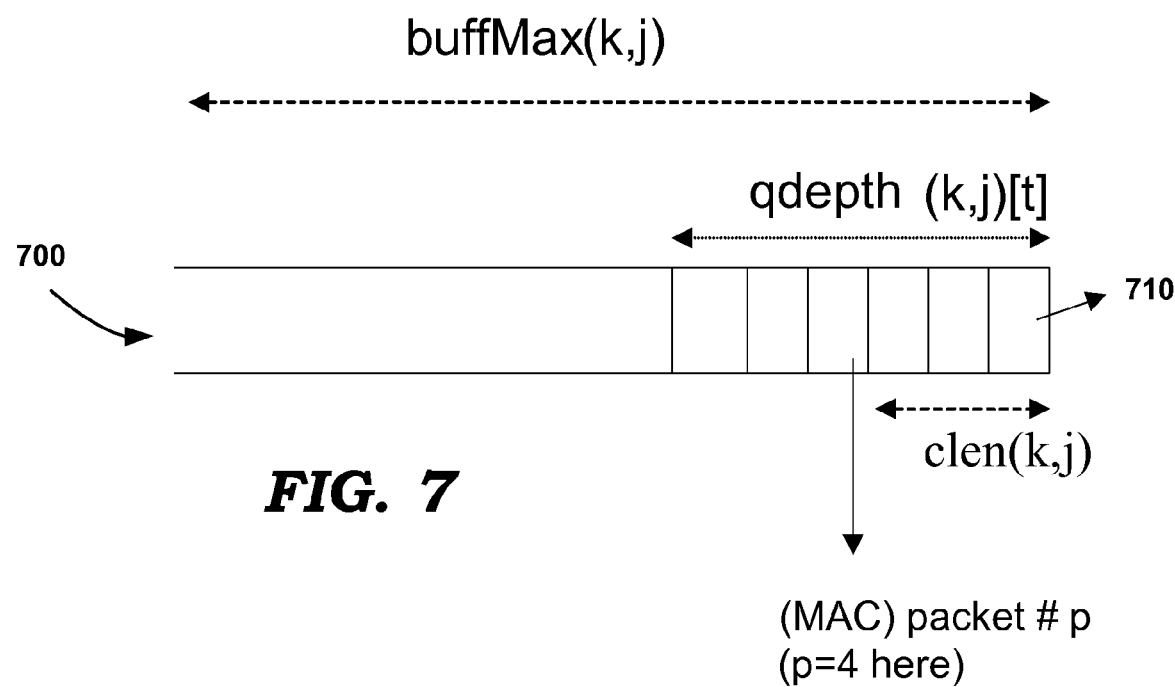
FIG. 7 depicts packets waiting transmission in a queue and is used to illustrate the terminology related to a queue/flow.

FIG. 7 represents jth queue/flow 700 corresponding to kth mobile device. BuffMax(k,j) represents maximum buffer length available for the queue, qdepth(k,j)[t] represents depth/length of queue (generally representing number of packets), packet 710 represents the head of the queue/flow the (first packet ready to be transmitted) and clen(k,j) represents a predetermined number of packets (instead of all packets in the queue) from the head/packet 710, which are used for various computations, as described below.

According to an aspect of the present invention, a suitable one of a number of computation techniques (algorithms) is used to compute a weighted value for each application, and then the available sub carriers are allocated to the mobile stations proportionate to the weighted values among the same class. As described below, each algorithm is suitable for specific classes of applications/flows (noted above).

8. Algorithm 1

Algorithm 1 provided according to an aspect of present invention computes the number of sub carriers for each queue/flow based on the required QoS parameters delay bound and throughput and corresponding observed QoS parameters delay bound and throughput.

Accordingly, the computation/determination of the number of sub carriers n(k,j)[t] allocated for jth flow in kth mobile device in a time slot t is given by:

$$n(k,j)[t] \alpha \theta(k,j)[t] \qquad \text{Equation (1)}$$

wherein proportionality provides scaling of number of sub carriers (allocated to the applications) depending upon the total number of sub carriers available in a wireless network and parameter $\theta(k,j)[t]$ is computed according to:

$$\theta(k,j)[t] = \mu(k,j) * d\text{bound\_delta\_flow}(k,j)[t] * q\text{depth\_flow}(k,j)[t] \qquad \text{Equation (2)}$$

wherein $\mu(k,j)$ represents a constant and is defined in sections below along with $\beta(k,j,p), q(k,j), \mu(k,j)$. The variable qdepth_flow(k,j)[t] represents a measure of relative queue depth of jth flow in kth mobile device and dbound_delta_flow(k,j)[t] represents a measure of proximity of delay bound in flow j at time slot t.

The variable dbound_delta_flow(k,j)[t] is given by:

$$\text{dbound\_delta\_flow}(k,j)[t] = \prod_{p=1, \Lambda(k,j,p) \neq 0}^{p=clen(k,j)} \text{dbound\_delta\_pkt}(k,j,p)[t] \qquad \text{Equation (3)}$$

wherein dbound_delta_pkt(k,j,p)[t] represents relative measure of proximity of delay bound of pth packet in jth flow of kth mobile device.

Equation 3 is computed for clen(k,j) number of packets from the flow head (the first packet ready to be transmitted). The number clen(k,j) may be determined based upon characteristics of flow (like its burstiness), observed QoS, observed channel quality, traffic management architecture of cellular system (like IP packet length, treatment given to it at different nodes in the network, etc.), available processing power, etc.

Equation 3 may be rewritten in expanded form as:

$$dbound\_delta\_flow(k,j)[t] = dbound\_delta\_pkt(k,j,1)[t] * \ldots * dbound\_delta\_pkt(k,j,clen(k,j))[t] \quad \text{Equation (3a)}$$

The variable dbound_delta_pkt(k,j,p)[t] is computed as:

$$dbound\_delta\_pkt(k,j,p)[t] = \left(\frac{\Delta_{max}(p)[t] + \delta\_d}{\Delta(k,j,p)[t]}\right)^{\beta(k,j,p)} \quad \text{Equation (4)}$$

wherein δ_d represents a constant and is set to a small positive value. Δ(k,j,p)[t] represents the absolute measure of how close the packet p is to violating its delay bound requirement and computed as:

$$\Delta(k,j,p)[t] = \begin{cases} \max\{dbound(k,j) - wtime(k,j,p)[t], 0\} \\ 0, \text{ if there is no such packet } p \text{ in the queue,} \\ \text{ or if } j = 3, 4 \text{ or } 5 \end{cases} \quad \text{Equation (5)}$$

and $\Delta_{max}(p)[t] = \text{maximum}\{\Delta(k,j,p)[t], \forall k, \forall j\}, \forall t$. If $\Delta(k,j,p)[t]=0$, then dbound_delta_pkt(k,j,p)[t] is set to a value 1.

The computed dbound_delta_flow(k,j)[t] is limited to swing between a predetermined maximum and minimum values for reliable operation and is given as:

$$db\_thresh\_low(k,j) \leq dbound\_delta\_flow(k,j)[t] \leq db\_thresh\_high(k,j), \forall k, \forall j, \forall t$$

Similarly the relative measure of queue depth qdepth_flow (k,j)[t] is computed as:

$$qdepth\_flow(k,j)[t] = \left(\frac{qdepth(k,j)[t]/min\_req\_rate(k,j)}{qdepth\_norm_{min}[t] - \delta\_q}\right)^{q(k,j)} \quad \text{Equation (6)}$$

wherein $\delta\_q$ represents a constant greater than zero such that $qdepth\_norm_{min}[t] > \delta\_q$, qdepth(k,j)[t] represents the queue depth (measure of number of packets) in jth flow of kth mobile device, min_req_rate(k,j) represents the minimum required rate of flow j of mobile k (specified as part of QoS requirements of that flow) and $qdepth\_norm_{min}[t]$ is computed as:

$$qdepth\_norm_{min}[t] = \min_{k,j}\left\{\frac{qdepth(k,j)[t]}{min\_req\_rate(k,j)}\right\} \quad \text{Equation (7)}$$

Equation 7 is computed considering the flows (for values of j and k) having qdepth(k,j)[t]>0.

The computations described above (algorithm 1) may be used to compute the number of sub carriers for class 1 and class 2 type of applications/flow. As may be appreciated, a class 1 flow may be assigned a higher β(•) or q(•) compared class 2 flows.

9. Algorithm 2

Algorithm 2 provided according to an aspect of present invention computes the number of sub carriers for each queue/flow based required QOS parameters average delay and queue depth. The number of sub carriers n(k,j)[t] allocated to jth flow/application in mobile station k according to algorithm 2 is given by:

$$n(k,j)[t] \alpha T(k,j)[t] \quad \text{Equation (8)}$$

wherein T(k,j)[t] is given by:

$$T(k,j)[t] = \mu(k,j)*avgdelay\_delta\_flow(k,j)[t]*qdepth\_flow\_III(k,j)[t] \quad \text{Equation (9)}$$

wherein avgdelay_delta_flow(k,j)[t] represents normalized measure of average delay and qdepth_flow_III(k,j)[t] represents normalized measure of queue depth.

The measure of average delay is computed according to:

$$avgdelay\_delta\_flow(k,j)[t] = \begin{cases} \frac{obs\_avgdelay(k,j)[t]}{target\_avgdelay(k,j)}, \\ \text{if } obs\_avgdelay(k,j)[t] > target\_avgdelay(k,j) \\ 1, \text{ otherwise} \end{cases} \quad \text{Equation (10)}$$

wherein obs_avgdelay(k,j)[t] represents observed average delay of flow j of mobile device k. The variable target_avgdelay(k,j) represents the average permitted delay specified according to QOS requirement.

The normalized queue depth is computed according to:

$$qdepth\_flow\_III(k,j)[t] = \left(\frac{qdepth(k,j)[t]}{qdepth_{min}[t] - \eta\_q}\right)^{q(k,j)} \quad \text{Equation (11)}$$

wherein $qdepth_{min}[t]$ represents depth of the queue having least number of packets at time slot t, $\eta\_q$ represents a constant greater than zero selected such that $qdepth_{min}[t] > \eta\_q$ and qdepth(k,j)[t] is defined in earlier sections.

The computed avgdelay_delta_flow(k,j)[t] is limited to swing between a predetermined maximum and minimum value for reliable operation and given as:

$$avgdelay\_delta\_lowthresh(k,j) \leq avgdelay\_delta\_flow(k,j)[t] \leq avgdelay\_delta\_highthresh(k,j), \forall k, \forall j, \forall t$$

The computation technique described above (algorithm 2) may be used to compute number of sub carriers for flows having class 3 requirement.

10. Algorithm 3

Algorithm 3 provided according to an aspect of the present invention computes the number of sub carriers for each queue/flow based on the required QOS parameter of guaranteed data transfer rate. Accordingly, computation of number of sub carriers based on data rate is given as:

$$n(k,j)[t] \alpha F(k,j)[t] \quad \text{Equation (12)}$$

wherein F(k,j)[t] is computed according to:

$$F(k,j)[t] = \mu(k,j)*reqrate\_delta\_flow(k,j)[t] \quad \text{Equation (13)}$$

wherein reqrate_delta_flow(k,j)[t] represents normalized measure of present data transfer rate and computed according:

$$\text{reqrate\_delta\_flow}(k, j)[t] = \qquad\qquad \text{Equation (14)}$$
$$\left(\frac{\text{reqrate\_delta}(k, j)[t]}{\text{reqrate\_delta\_min}[t] - \delta\_r}\right)^{r(k,j)}$$

wherein reqrate_delta_min[t] =

$$\text{minimum}\{\text{reqrate\_delta}(k, j)[t], \forall k, \forall j\}.$$

The reqrate_delta(k,j)[t] is computed as:

$$\text{reqrate\_delta}(k, j)[t] = \qquad\qquad \text{Equation (15)}$$
$$\begin{cases} \frac{\text{min\_req\_rate}(k, j) - \text{ser\_rate}(k, j)[t]}{\text{min\_req\_rate}(k, j)}, & \forall k, \forall t, j = 1 \text{ or } 2, \\ \qquad\text{if min\_req\_rate}(k, j) \neq 0, & \text{ser\_rate}(k, j)[t] < \text{min\_req\_rate}(k, j); \\ 1, & \text{otherwise} \end{cases}$$

wherein min_req_rate(k,j) represents the minimum required data rate of flow j of mobile station k (required QoS parameter) and ser_rate(k,j)[t] represents the present bit rate being served.

The computation technique described above (algorithm 3) may be used to compute number of sub carriers for flows having class 4 requirement such as FTP.

11. Algorithm 4

Algorithm 4 provided according to an aspect of present invention uses data size/file size as one of the criteria for determining the number of sub carriers for allocation. The number of sub carriers computed against size of the data is given by $$n(k,j)[t] \alpha F2(k,j)[t] \qquad\qquad \text{Equation (16)}$$

wherein F2(k,j)[t] is computed according to:

$$F2(k, j)[t] = \mu(k, j) * \left(\frac{\text{filesize\_rem}(k, j)[t]}{\text{filesize\_rem\_min}[t]}\right) \qquad \text{Equation (17)}$$

wherein filesize_rem(k,j)[t] represents the total data/file size remaining for transmission and it is computed as:

filesize_rem(k,j)[t]=total data(file)size to be sent−size of file(data)sent by time t. Equation (18)

Equation 18 is computed for every flow j. The term filesize_rem_min[t] in equation 17 represents minimum value of equation 18 when computed for all values of k and j and is given by filesize_rem_min[t]=minimum{filesize_rem(k,j)[t], ∀k, ∀j}.

The computation technique described above (algorithm 4) may be used for computing the (normalized) number of sub carriers for flows belonging to class 5 requirement.

The manner in which BS 140 performs sub carrier allocation using computation techniques described above in an example embodiment of the present invention is described below.

12. Sub Carrier Allocation

According to the description provided in above sections, BS 140 maintains and monitors queue for each flow for the forward link. Accordingly BS 140 may classify flows into corresponding classes 1-4 based on the defining required QOS parameters as described above.

BS 140 computes the weighted values of sub carriers for flows in class 1 and class 2 using algorithm 1, and allocates the computed number of sub carriers to the flows belonging to classes 1 and 2.

The remaining sub carriers may be allocated for the flows belonging to class 3, class 4 and class 5 using algorithm 2, 3 and 4 according to the respective weights computed above.

BS 140 may further identify sub carriers based on the channel quality described with reference to FIG. 3B. In an embodiment of the present invention BS 140 computes:

$$Y_{k,j}[t] = \frac{h(k, s)[t]}{T_{k,j}(t)} \qquad\qquad \text{Equation (19)}$$

wherein h(k,s)[t] represents channel quality as received by mobile device k for sub carrier s, $T_{k,j}(t)$ represents the throughput of flow j of mobile device k. Equation 19 is computed for either each sub carrier or group of sub carriers for each flow.

BS 140 assigns a sub carrier s or a group of sub carriers to mobile device k for which above metric, $Y_{k,j}[t]$ is the highest. Thus, the approaches described above illustrate the manner in which the number of sub carriers are optimally allocated to each flow in a mobile station, as well as the manner in which specific sub carrier may be allocated to the mobile station based on the channel quality.

The description is continued with respect to the manner in which BS 140 may perform sub carrier allocations for reverse link according to various aspect of present invention.

13. Sub Carrier Allocation in Reverse Link Direction

Figure 8:
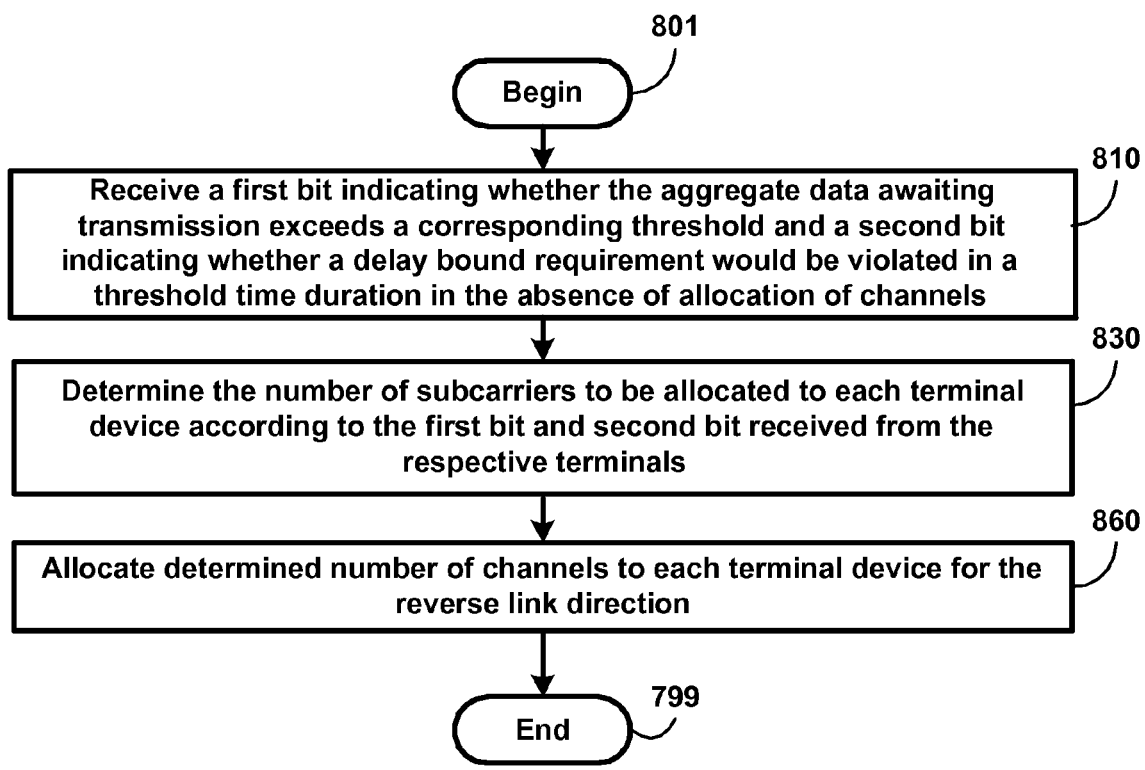
FIG. 8 is a flowchart illustrating reverse link sub carrier allocation according to several aspects of the present invention.

FIG. 8 is a flowchart illustrating the manner in which a base station allocates sub carriers in reverse link direction according to several aspects of the present invention. The flowchart is described with respect to the components of FIG. 5 for illustration. However, the features can be implemented in other environments, without departing from the scope and spirit of various aspects of the present invention. The flowchart begins in step 801 and control passes to step 810.

In step 810, resource allocator 550 receives a first bit indicating whether the aggregate data awaiting transmission exceeds the corresponding threshold and a second bit indicating whether a delay bound requirement would be violated in a threshold time duration in the absence of allocation of sub carriers (from each mobile station or terminal device). Manner in which values of first bit and second bit are determined and transmitted to base station 140 in an example embodiment of the present invention is described below in further detail.

In step 830, resource allocator 550 determines the number of sub carriers to be allocated to each terminal device according to the first bit and second bit received from the respective terminals. An example approach is described below in further detail.

In step 860, resource allocator 550 allocates the determined number of sub carriers to the mobile devices. The flow chart ends in step 899.

Determination of first bit value and second bit values according to an aspect of the present invention is described below in further detail.

14. Determination of First Bit and Second Bit in the Terminal Device

The (logical) value first bit $b_1(k)[t]$ at time slot t is selected according to a standard as:

$$\text{Set } b_1(k)[t] = \begin{cases} 1, & \text{if } \textit{bufflenRL}(k)[t] > \text{buff\_thresh}(k) \\ 0, & \text{otherwise} \end{cases} \quad \text{Equation (20)}$$

wherein buff_thresh(k) represents a predetermined threshold value, bufflenRL(k)[t] represents aggregate buffer length. For example, if mobile device k is running two applications with corresponding flows having 100 bytes and 1000 bytes in the queue (buffer), then bufflenRL(k)[t]=1100.

The value second bit $b_2(k)[t]$ at time slot t is selected according to an aspect of present invention as:

$$b_2(k)[t] = \begin{cases} 1, & \text{if } \dfrac{dbound(k, jsel_k[t]) - wtime(k, jsel_k[k], 1)[t]}{dbound(k, jsel_k[t])} < \text{d\_thresh}(k) \\ 0, & \text{otherwise} \end{cases} \quad \text{Equation (21)}$$

wherein delay bound dbound and wait time wtime are as defined in earlier sections. $jsel_k[t]$ represents a selected flow in the time slot t by mobile station/device k. If mobile station k has multiple flows associated with class 1 or 2, the flow for which HOL (head of the flow) packet is closest to its deadline is selected as $jsel_k[t]$. d_thresh(k) represents a predefined constant. The mobile terminals having at least one flow belonging to class 1 or 2 at time t, computes the second bit $b_2(k)[t]$ and transmits the computed second bit to base station 140. The other mobile terminals do not use second bit.

In one embodiment of the present invention, the first bit $b_1(k)[t]$ is transmitted to BS 140 on a signaling channel (control channel) as defined in 3GPP standard. The second bit may be transmitted to BS 140 via standardized QoS signaling protocol, RSVP (IP) signaling. As is well known, RSVP allows use of optional policy object. We use one such object for this purpose. Alternatively any cooperating approach (e.g., as a custom application using TCP sockets) may be implemented on both the mobile terminal and the base station to exchange the second bit. Such approaches will be apparent to one skilled in the relevant arts.

The manner in which BS 140 determines the number of sub carriers for a reverse link based on the received first bit and second bit is described below in further detail.

15. Sub Carrier Allocation for Reverse Link

We first consider the mobile terminals that have at least one flow belonging to class 1 or 2. For each mobile k, the number of sub carriers $n_r(k)[t]$ for reverse link based on the received first and second bits is given by the proportionate relation as:

$$n_r(k)[t] \alpha \Delta_r(k)[t] \quad \text{Equation (22)}$$

wherein $\Delta_r(k)[t]$ is computed as:

$$\Delta_r(k)[t] = \mu_r(k) * q\text{depth\_delay}_r(k)[t] \quad \text{Equation (23)}$$

wherein $\mu_r(k)$ represents a constant for terminal k and qdepth_delay is computed as below. BS 140 computes equation 23 using different values for $q\text{depth\_delay}_r(k)[t]$ based on first bit and second bits. $q\text{depth\_delay}_r(k)[t]$ computation for each combination of first bit and second bit is given below.

If $b_1(k)[t] = 1$ and $b_2(k)[t] = 1$, then    Equation (24)

$$q\text{depth\_delay}_r(k)[t] = \left( \frac{\max\{B_{max}(k)[t], \text{buff\_thresh}(k)\}}{\text{agg\_req\_rate}_{j=1,2,3,4}(k)} \right)^{x(k)}$$

wherein $B_{max}(k)[t] =$ $$\sum_{j=1}^{4} B_{max\_pending}(k, j)[t] \text{ and } B_{max\_pending}(k, j)[t] =$$

$$\max\{f(k, j, t) - Tx(k, j)[t], 0\},$$

wherein, f(•) represents traffic envelope function that is used for shaping a flow (the reverse link flows are shaped at mobile device before they are allowed to send data towards base station) f(k,j,t) represents the maximum number of bits that are allowed to be transmitted from a reverse link flow j (of mobile terminal k) by time t and Tx(k,j)[t] represents the number of bits that have been transmitted for this reverse link flow by time t.

In one embodiment, the number of bits that have been transmitted by a terminal device is counted at the base station as these get transmitted from mobile station to destination of flow via base station. The buff-thresh(k) in equation 24 represents a pre-defined threshold for each mobile k.

If $b_1(k)[t] = 0$ and $b_2(k)[t] = 1$, then    Equation (25)

$$q\text{depth\_delay}_r(k)[t] = \left( \frac{\text{buff\_thresh}(k)}{\text{agg\_req\_rate}_{j=1,2}(k)} \right)^{x(k)}$$

If $b_1(k)[t] = 1$ and $b_2(k)[t] = 0$, then    equation (26)

$$q\text{depth\_delay}_r(k)[t] = \left( \frac{\max\{B_{max}(k)[t], \text{buff\_thresh}(k)\}}{\text{agg\_req\_rate}_{j=1,2,3,4}(k)} \right)$$

If $b_1(k)[t]=0$ and $b_2(k)[t]=0$ for a terminal k, we allocate a random number of subcarriers to this terminal k from the remaining subcarriers after allocating sub carriers to all other mobile terminals that have either $b_1(k)[t] \neq 0$ or $b_2(k)[t] \neq 0$.

We now consider mobile stations that have only flows belonging to class 3 or 4 (i.e. j=3 or j=4). Such mobile stations need to send only one bit. Accordingly, mobile stations sends only one bit b1(k)[t], to the base station.

In this case, the $B_{max\_pending}(k,j)[t]$ and $B_{max}(k)[t]$ are respectively computed as:

$$B_{max\_pending}(k, j)[t] = \max\{f(k, t, j) - Tx(k, j)[t], 0\},$$

-continued $$B_{\max}(k)[t] = \sum_{j=3}^{4} B_{max\_pending}(k, j)[t]$$

If b1(k)[t] Is equal to 1 the number of sub carriers are computed as $$n_r(k)[t]\alpha \frac{\max\{B_{max}(k)[t], \text{buff\_thresh}(k)\}}{\text{agg\_req\_rate}_{j=3,4}(k)} * \text{abs}\left(\frac{\text{agg\_req\_rate}_{j=3,4}(k) - \text{agg\_served\_rate}(k)[t]}{\text{agg\_req\_rate}_{j=3,4}(k)}\right)$$

Equation (27)

wherein agg_req_rate$_{j=3,4}$(k) represents the aggregate required rate for mobile station k for flows corresponding to class j=3,4. Base station monitors packets for RL flows and computes aggregate served rate for mobile station k for RL flows (agg_served_rate). Otherwise, this terminal is allocated a random number of subcarriers for reverse link after allocating sub carriers to all the other terminals that have either $b_1(k)[t] \neq 0$ or $b_2(k)[t] \neq 0$. Flows belonging to class 5 are also allocated sub carriers randomly after allocating subcarriers to all other flows.

From the above, it may be appreciated that the sub carriers are allocated to meet the differentiated QoS requirements of various applications in both the forward link and reverse link directions. While the description is provided with respect to computing parameters representing the required QoS and the observed QoS for illustration, it may be appreciated that multiple parameters representing the transport requirements (represented by QoS requirements, status of various queues, provided QoS, etc.) may be determined as suited for the different environment, as will be apparent to one skilled in the relevant arts by reading the disclosure provided herein. Such consideration of different transport requirements would facilitate more optimal allocation of the sub carriers.

To facilitate such features each of the mobile stations and the base station can be implemented in a combination of one or more hardware, software and firmware, as suitable in the specific situation. The description is continued with respect to an embodiment in which the features are operative upon execution of the corresponding software instructions.

16. Machine Readable Medium

Figure 9:
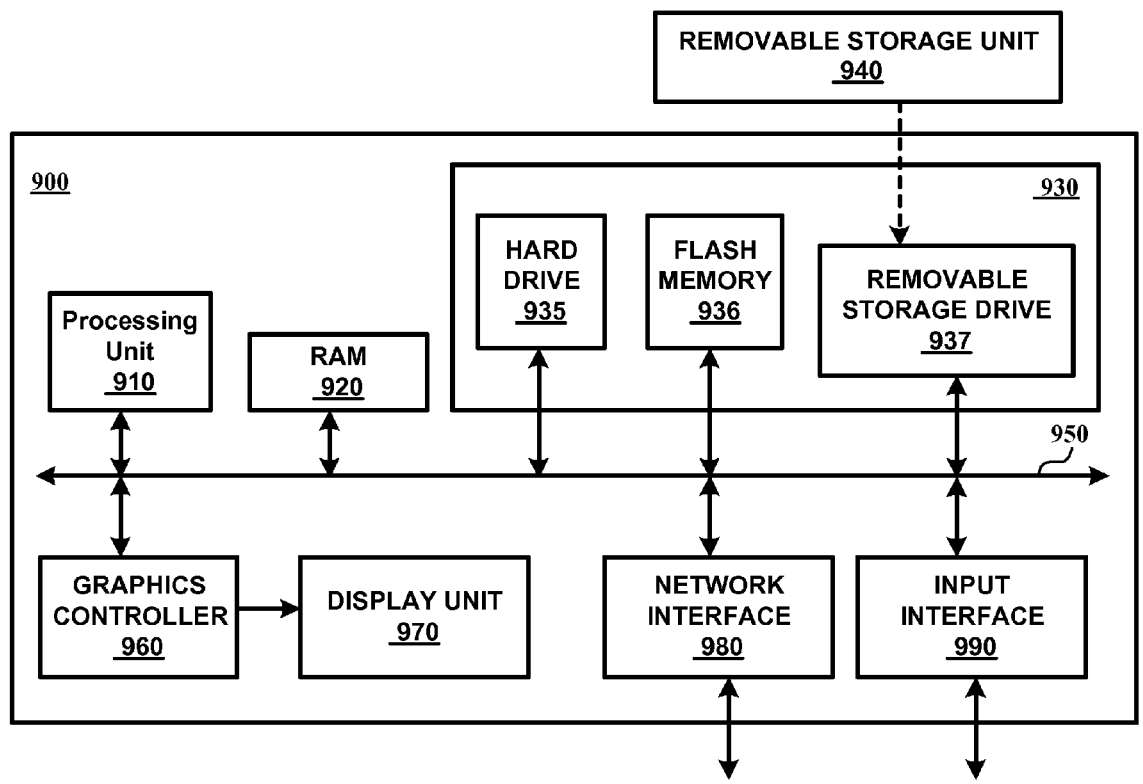
FIG. 9 is a block diagram of computer system illustrating the details of an example system in which various features are operative by execution of software instructions in an embodiment of the present invention.

FIG. 9 is a block diagram of computer system 900 illustrating an example system in an embodiment of the present invention. Computer System 900 may correspond to each of a portion of a base station and a mobile station. Computer system 900 may contain one or more processors such as central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 represents an embedded processor such as DSP (digital signal processing) processors, ARM processor etc., well known in the relevant arts, and may execute instructions stored in RAM 920 to provide several features of the present invention. For example, the mobile station may examine parameters such as delay values and queue lengths, and transmit the two bits noted above. On the other hand, a base station may compute the number of sub carriers to be allocated to each mobile station or base station (in forward and reverse link directions) in each time slot as described above.

CPU 910 may contain multiple processing units, with each processing unit potentially being designed for a specific task. For example, a DSP processor may implement queues described in FIGS. 4A and 4B. An ARM processor may perform task of Network layer queue and applications. In the case of a mobile station, CPU 910 may contain only a single processing unit. RAM 920 may receive instructions from secondary memory 930 using communication path 950.

Graphics controller 960 generates display signals (e.g., in RGB format) to display unit 970 based on data/instructions received from CPU 910. Display unit 970 contains a display screen to display the images defined by the display signals. Input interface 990 may correspond to a key-board and/or mouse, and generally enables a user to provide inputs. Network interface 980 contains various antennas and other interfaces needed to communicate with external devices.

Secondary memory 930 may contain hard drive 935, flash memory 936 and removable storage drive 937. Secondary storage 930 may store the software instructions and data, which enable computer system 900 to provide several features in accordance with the present invention.

Some or all of the data and instructions may be provided on removable storage unit 940, and the data and instructions may be read and provided by removable storage drive 937 to CPU 910. Floppy drive, magnetic tape drive, CD_ROM drive, DVD Drive, Flash memory, removable memory chip (PCM-CIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable storage medium having stored therein computer software and/or data. An embodiment of the present invention is implemented using software running (that is, executing) in computer system 900.

In this document, the term "computer program product" is used to generally refer to removable storage unit 940 or hard disk installed in hard drive 935. These computer program products are means for providing software to computer system 900. As noted above, CPU 910 may retrieve the software instructions, and execute the instructions to provide various features of the present invention.

17. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of allocating a plurality of sub carriers among a plurality of applications in a wireless network, said plurality of applications being executed on corresponding terminal devices, said plurality of sub carriers being formed by dividing a frequency spectrum, each of said plurality of applications having a corresponding required quality of services (QoS), said method comprising:

determining a first set of parameters representing said required QoS and a second set of parameters representing an observed QoS for each of said plurality of applications;

computing a corresponding number of sub carriers to be allocated in each of a sequence of time slots to respective ones of said plurality of applications using said first set of parameters and said second set of parameters; and allocating said corresponding number of sub carriers to respective ones of said plurality of applications in the corresponding one of said sequence of time slots;

wherein said computing calculates a difference of the observed and the required values of the corresponding parameters in determining said corresponding number of sub carriers; and wherein said first set of parameters comprises at least one of a required delay bound, a required throughput, a required average delay for each of said plurality of applications and wherein said second set of parameters comprises at least one of an observed queue length, an observed throughput, an observed average delay, and an observed delay bound for each of said plurality of applications.

2. The method of claim 1, wherein said determining comprises:

classifying said plurality of applications into a plurality of classes; and identifying said first set of parameters for each of said plurality of applications based on the specific class in which the application belongs.

3. The method of claim 2, wherein said classifying comprises examining a content of packets sent to or received from a corresponding application.

4. The method of claim 2, wherein said plurality of sub carriers are from a base station to said terminal devices in a forward link direction, wherein a queue stores packets awaiting transmission in said base station and are related to a first application in a first terminal device, and said first application is contained in said plurality of applications executing in said first terminal device.

5. The method of claim 4, wherein a jth flow is classified into a first class contained in said plurality of classes, said jth flow storing packets destined to kth mobile device with a required delay bound and a required throughput of as corresponding first set of parameters, and wherein said computing of said corresponding number of sub carriers is performed according to $$n(k,j)[t] \alpha \theta(k,j)[t]$$

wherein $\theta(k, j)[t] = \mu(k, j)*$dbound_delta_flow$(k, j)[t]$ $*$qdepth_flow$(k, j)[t]$ wherein $\mu(k, j)$ represents a constant, said dbound_delta_flow$(k, j)[t]$ is computed according to $$\text{dbound\_delta\_flow}(k, j)[t] = \prod_{p=1, \Delta(k,j,p) \neq 0}^{p=clen(k,j)} \text{dbound\_delta\_pkt}(k, j, p)[t]$$

wherein $\text{dbound\_delta\_pkt}(k, j, p)[t] = \left( \frac{\Delta_{max}(p)[t] + \delta\_d}{\Delta(k, j, p)[t]} \right)^{\beta(k,j,p)}$ $\Delta(k, j, p)[t] =$
$\begin{cases} \max\{dbound(k, j) - wtime(k, j, p)[t], 0\} \\ 0, \text{ if there is no such packet } p \text{ in the queue, or if } j = 3, 4, \text{ or } 5 \end{cases}$ $\Delta_{max}(p)[t] = \text{maximum}\{\Delta(k, j, p)[t], \forall k, \forall j\}, \forall t,$ and qdepth_flow$(k, j)[t]$ is computed according to $$\text{qdepth\_flow}(k, j)[t] = \left( \frac{qdepth(k, j)[t] / \min\_req\_rate(k, j)}{qdepth\_norm_{min}[t] - \delta\_q} \right)^{q(k,j)}$$

qdepth$(k, j)[t]$ represents the queue depth, min_req_rate$(k, j)**$, qdepth_norm$_{min}[t]$ is computed according to $$\text{qdepth\_norm}_{min}[t] = \min_{k,j} \left\{ \frac{qdepth(k, j)[t]}{\min\_req\_rate(k, j)} \right\} \quad \text{Equation (7)}$$

and $\delta\_q$ represents constant.

6. The method of claim 2, wherein one of said plurality of classes comprises applications requiring an average delay and a throughput rate as said corresponding subset of QoS requirements, and wherein said computing of said corresponding number of sub carriers is performed according to $$n(k,j)[t] \alpha T(k,j)[t]$$

wherein $T(k,j)[t] = \mu(k,j)*$avgdelay_delta_flow$(k,j)[t]*q$depth_flow_III$(k,j)[t]$ wherein said avgdelay_delta_flow$(k, j)[t]$ is computed according to avgdelay_delta_flow$(k, j)[t] =$ $\begin{cases} \frac{obs\_avgdelay(k, j)[t]}{target\_avgdelay(k, j)}, \text{ if } obs\_avgdelay(k, j)[t] > target\_avgdelay(k, j) \\ 1, \text{ otherwise} \end{cases}$ wherein
obs_avgdelay(k, j)[t] represents observed average delay of flow j of mobile device k and
target_avgdelay(k, j) represents average permitted delay specified according to QOS requirement,
and said qdepth_flow_III(k, j)[t] is computed according to $$\text{qdepth\_flow\_III}(k, j)[t] = \left(\frac{qdepth(k, j)[t]}{qdepth_{min}[t] - \eta\_q}\right)^{q(k,j)}$$

wherein $qdepth_{min}[t]$ represents depth of the queue having least number of packets at time slot t.

7. The method of claim 3, wherein one of said plurality of classes comprises applications requiring a throughput rate, wherein said computing of said corresponding number of sub carriers is performed according to wherein $n(k,j)[t] \alpha F(k,j)[t]$ wherein $F(k,j)[t] = \alpha(k,j) * \text{reqrate\_delta\_flow}(k,j)[t]$ wherein said reqrate_delta_flow(k, j)[t] is computed according to $$\text{reqrate\_delta\_flow}(k, j)[t] = \left(\frac{\text{reqrate\_delta}(k, j)[t]}{\text{reqrate\_delta\_min}[t] - \delta\_r}\right)^{r(k,j)},$$

and said reqrate_delta(k,j)[t] is computed according to:

$\text{reqrate\_delta}(k, j)[t] =$
$\begin{cases} \frac{\min\_req\_rate(k, j) - ser\_rate(k, j)[t]}{\min\_req\_rate(k, j)}, \forall k, \forall t, j = 1 \text{ or } 2, \\ \quad \text{if } \min\_req\_rate(k, j) \neq 0, ser\_rate(k, j)[t] < \min\_req\_rate(k, j) \\ 1, \text{ otherwise} \end{cases}$ and said reqrate_delta_min[t] is computed according to reqrate_delta_min[t]=minimum{reqrate_delta(k,j)[t], ∀k,∀j} where in min_req_rate(k, j) represents the minimum throughput data rate and ser_rate(k, j)[t] represents the present bit rate being served.

8. The method of claim 2, wherein one of said plurality of classes comprises applications requiring a transfer of a data size, wherein said computing of said corresponding number of sub carriers is performed according to $n(k,j)[t] \alpha F2(k,j)[t]$ wherein $$F2(k, j)[t] = \mu(k, j) * \left(\frac{\text{filesize\_rem}(k, j)[t]}{\text{filesize\_rem\_min}[t]}\right)$$

wherein said filesize_rem(k, j)[t] is computed according to filesize_rem(k,j)[t]=total data(file)size to be sent−size of file(data)sent by time t and said filesize_rem_min[t] is computed according to filesize_rem_min[t]=minimum{filesize_rem(k,j)[t], ∀k,∀j}.

9. The method of claim 2, wherein said plurality of sub carriers are from said plurality of terminal devices to a base station in a reverse link direction, wherein said second set of parameters are received from each of said plurality of terminal devices.

10. The method of claim 9, wherein each of said first set of parameters comprises a first bit transmitted on a control channel provided by said wireless network and each of said second parameter comprises a second bit, wherein said second bit is transmitted by terminals having a delay bound requirement.

11. The method of claim 10, wherein said first bit indicates that queue length storing data in the corresponding terminal device is greater than said corresponding threshold and said second bit indicating whether said packet awaiting transmission in said each of said plurality of terminal devices is expected to violate said delay bound requirement, wherein said computing is performed according to $\Delta_r(k)[t] = \mu_r(k) * \text{qdepth\_delay}_r(k)[t]$ where in $\mu_r(k)$ represents a constant, said $\text{qdepth\_delay}_r(k)[t]$ is computed according to $$\text{qdepth\_delay}_r(k)[t] = \left(\frac{\max\{B_{max}(k)[t], \text{buff\_thresh}(k)\}}{\text{agg\_req\_rate}_{j=1,2,3,4}(k)}\right)^{x(k)}$$

$$\text{wherein } B_{max}(k)[t] = \sum_{j=1}^{4} B_{max\_pending}(k, j)[t] \text{ and } B_{max\_pending}(k, j)[t]$$

$$= \max\{f(k, jt) - Tx(k, j)[t], 0\},$$

12. The method of claim 9, wherein a first set of mobile stations do not have a delay bound requirement, whereby said base station does not receive said second bit for said first set of mobile stations, said first bit indicates queue length storing data in the corresponding terminal device is less than said corresponding threshold wherein said computing is performed according to $$n_r(k)[t] \alpha \frac{\max\{B_{max}(k)[t], \text{buff\_thresh}(k)\}}{\text{agg\_req\_rate}_{j=3,4}(k)} *$$

$$\text{abs}\left(\frac{\text{agg\_req\_rate}_{j=3,4}(k) - \text{agg\_served\_rate}(k)[t]}{\text{agg\_req\_rate}_{j=3,4}(k)}\right)$$

wherein $\text{agg\_req\_rate}_{j=3,4}(k)$ represents the aggregate required rate for mobile station k and
$\text{agg\_served\_rate}(k)[t]$ represents aggregate served rate for mobile station k.

13. The method of claim 9, wherein said first bit indicates queue length storing data in the corresponding terminal device is less than said corresponding threshold and said second bit indicating whether said packet awaiting transmission in said each of said plurality of terminal devices is expected to violate said delay bound requirement, wherein said computing is performed according to $\Delta_r(k)[t] = \mu_r(k) * \text{qdepth\_delay}_r(k)[t]$ $$\text{wherein qdepth\_delay}_r(k)[t] = \left(\frac{\text{buff\_thresh}(k)}{\text{agg\_req\_rate}_{j=1,2}(k)}\right)^{x(k)}$$

wherein buff_thresh(k) represents a predetermined threshold value
$\text{agg\_req\_rate}_{j=1,2}(k)$ represents the aggregate required rate for mobile station k.

14. The method of claim 9, wherein said first bit indicates queue length storing data in the corresponding terminal device is greater than said corresponding threshold and said second bit indicating whether a packet awaiting transmission in said each of said plurality of terminal devices is not expected to violate said delay bound requirement, wherein said computing is performed according to $$\Delta_r(k)[t] = \mu_r(k) * \text{qdepth\_delay}_r(k)[t]$$

$$\text{wherein qdepth\_delay}_r(k)[t] = \left(\frac{\max\{B_{max}(k)[t], \text{buff\_thresh}(k)\}}{\text{agg\_req\_rate}_{j=1,2,3,4}(k)}\right)$$

15. The method of claim 9, wherein said first bit value is computed according to $$\text{Set } b_1(k)[t] = \begin{cases} 1, & \text{if } \text{bufflenRL}(k)[t] > \text{buff\_thresh}(k) \\ 0, & \text{otherwise} \end{cases}$$

wherein buff_thresh(k) represents a predetermined threshold value and
bufflenRL(k)[t] represents aggregate buffer length.

16. The method of claim 9, wherein said second bit value is computed according to $$b_2(k)[t] = \begin{cases} 1, & \text{if } \frac{\text{dbound}(k, \text{jsel}_k[t]) - \text{wtime}(k, \text{jsel}_k[t], 1)[t]}{\text{dbound}(k, \text{jsel}_k[t])} < \text{d\_thresh}(k) \\ 0, & \text{otherwise} \end{cases}$$

wherein $\text{jsel}_k[t]$ represents a selected flow in the time slot t
d_thresh(k) represents a predefined constant
dbound(k,$\text{jsel}_k$[t]) represents delay-bound for kth mobile station.

17. The method of claim 1, wherein a first application and a second application contained in said plurality of applications are executed in a single terminal device contained in said terminal devices,
wherein a first number of sub-carriers are allocated to said first application and a second number of carriers are allocated to said second application.

18. A computer readable medium carrying one or more sequences of instructions to cause a base station to allocate a plurality of sub carriers among a plurality of applications in a wireless network, said plurality of applications being executed on corresponding terminal devices, wherein a first application and a second application contained in said plurality of applications being executed in a single terminal device contained in said terminal devices, said plurality of sub carriers being formed by dividing a frequency spectrum, each of said plurality of application having a corresponding required quality of services (QoS), wherein execution of said one or more sequences of instructions by one or more processors contained in said base station causes said one or more processors to perform the actions of:
determining a first set of parameters representing said required QoS and a second set of parameters representing an observed QoS for each of said plurality of applications;
computing a corresponding number of sub carriers to be allocated in a time slot to respective ones of said plurality of applications using said first set of parameters and said second set of parameters; and
allocating said corresponding number of sub carriers to respective ones of said plurality of applications in said time slot;
wherein a first number of sub-carriers are allocated to said first application and a second number of carriers are allocated to said second application, wherein said first number is not equal to said second number; and
wherein said first set of parameters comprises at least one of a required delay bound, a required throughput, a required average delay for each of said plurality of applications and wherein said second set of parameters comprises at least one of an observed queue length, an observed throughput, an observed average delay, and an observed delay bound for each of said plurality of applications.

19. The computer readable medium of claim 18, wherein said determining comprises:
classifying said plurality of applications into a plurality of classes; and
identifying said first set of parameters for each of said plurality of applications based on the specific class in which the application belongs.

20. The computer readable medium of claim 19, wherein said computing calculates a difference of the observed and the required values of the corresponding parameters in determining said corresponding number of sub carriers.

21. The computer readable medium of claim 20, wherein said classifying comprises examining a content of packets sent to or received from a corresponding application.

22. The computer readable medium of claim 20, wherein said plurality of sub carriers are from a base station to said terminal devices in a forward link direction, wherein a queue stores packets awaiting transmission in said base station and are related to a first application in a first terminal device, and said first application is contained in said plurality of applications executing in said first terminal device.

23. The computer readable medium of claim 22, wherein a jth flow is classified into a first class contained in said plurality of classes, said jth flow storing packets destined to kth mobile device with a required delay bound and a required throughput of as corresponding first set of parameters, and wherein said computing of said corresponding number of sub carriers is performed according to $$n(k,j)[t] \alpha \theta(k,j)[t]$$

wherein θ(k, j)[t]=μ(k, j)*dbound_delta_flow(k, j)[t] *qdepth_flow(k, j)[t]
wherein μ(k, j) represents a constant, said dbound_delta_flow(k, j)[t] is computed according to $$\text{dbound\_delta\_flow}(k, j)[t] = \prod_{p=1, \Delta(k,j,p)\neq 0}^{p=\text{clen}(k,j)} \text{dbound\_delta\_pkt}(k, j, p)[t]$$

$$\text{wherein dbound\_delta\_pkt}(k, j, p)[t] = \left(\frac{\Delta_{max}(p)[t] + \delta\_d}{\Delta(k, j, p)[t]}\right)^{\beta(k,j,p)}$$

δ_d represents a constant, $$\Delta(k, j, p)[t] = \begin{cases} \max\{dbound(k, j) - wtime(k, j, p)[t], 0\} \\ 0, \text{ if there is no such packet } p \text{ in the queue, or if } j = 3, 4 \text{ or } 5 \end{cases}$$

$$\Delta_{max}(p)[t] = \text{maximum}\{\Delta(k,j,p)[t], \forall k, \forall j\}, \forall t,$$

and qdepth_flow(k, j)[t] is computed according to $$\text{qdepth\_flow}(k, j)[t] = \left(\frac{qdepth(k, j)[t]/\min\_req\_rate(k, j)}{qdepth\_norm_{min}[t] - \delta\_q}\right)^{q(k,j)}$$

qdepth(k, j)[t] represents the queue depth, min_req_rate(k, j)**,
qdepth_norm$_{min}$[t] is computed according to $$\text{qdepth\_norm}_{min}[t] = \min_{k,j}\left\{\frac{qdepth(k, j)[t]}{\min\_req\_rate(k, j)}\right\} \quad \text{Equation (7)}$$

and

δ_q represents constant.

24. The computer readable medium of claim 20, wherein said plurality of sub carriers are from said plurality of terminal devices to a base station in a reverse link direction, wherein said second set of parameters are received from each of said plurality of terminal devices.

25. The computer readable medium of claim 20, wherein each of said first set of parameters comprises a first bit transmitted on a control channel provided by said wireless network and each of said second parameter comprises a second bit, wherein said second bit is transmitted by terminals having a delay bound requirement.

26. The computer readable medium of claim 25, wherein said first bit indicates that queue length storing data in the corresponding terminal device is greater than said corresponding threshold and said second bit indicating whether said packet awaiting transmission in said each of said plurality of terminal devices is expected to violate said delay bound requirement.

27. A base station for allocating a plurality of sub carriers among a plurality of applications in a wireless network, said plurality of applications being executed on corresponding terminal devices, said plurality of sub carriers being formed by dividing a frequency spectrum, each of said plurality of application having a corresponding required quality of services (QoS), said base station comprising:
   a memory storing packets related to each of said plurality of applications; and
   a resource scheduler block designed to determine a first set of parameters representing said required QoS and a second set of parameters representing an observed QoS for each of said plurality of applications, said resource scheduler block designed to compute a corresponding number of sub carriers to be allocated in a time slot to respective ones of said plurality of applications using said first set of parameters and said second set of parameters, said resource scheduler block further designed to allocate said corresponding number of sub carriers to respective ones of said plurality of applications in said time slot; and
   wherein said first set of parameters comprises at least one of a required delay bound, a required throughput, a required average delay for each of said plurality of applications and wherein said second set of parameters comprises at least one of an observed queue length, an observed throughput, an observed average delay, and an observed delay bound for each of said plurality of applications.

28. The base station of claim 27, wherein said resource scheduler is designed to classify said plurality of applications into a plurality of classes, and identify said first set of parameters for each of said plurality of applications based on the specific class in which the application belongs.

29. The base station of claim 28, wherein said resource scheduler is designed to calculate a difference of the observed and the required values of the corresponding parameters in determining said corresponding number of sub carriers.

* * * * *